Sept. 25, 1928.  J. W. HOLT  1,685,130
VEHICLE WHEEL STRUCTURE
Filed Oct. 5, 1926  2 Sheets-Sheet 1
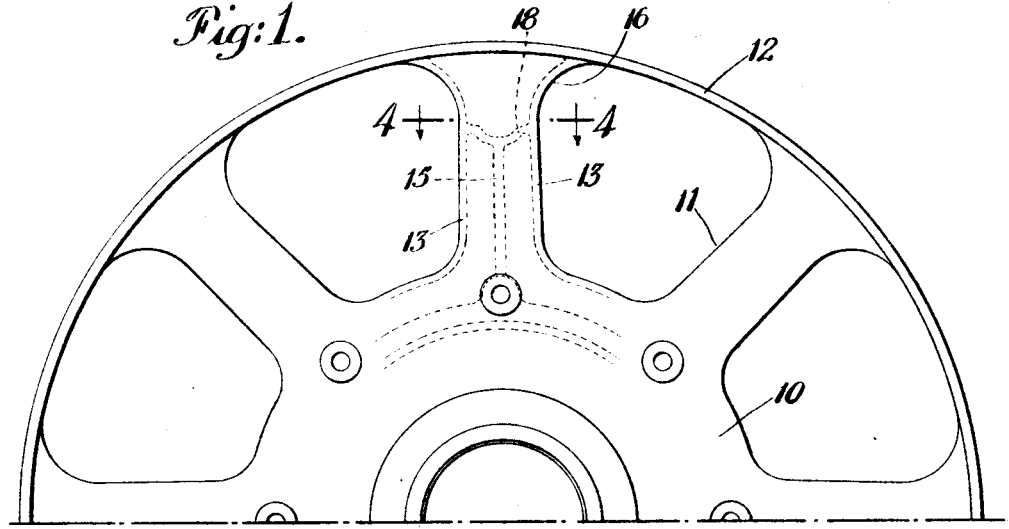
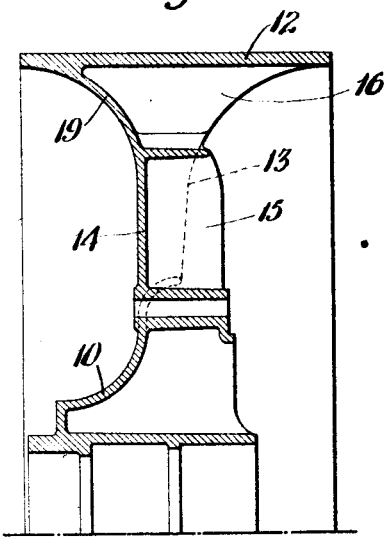
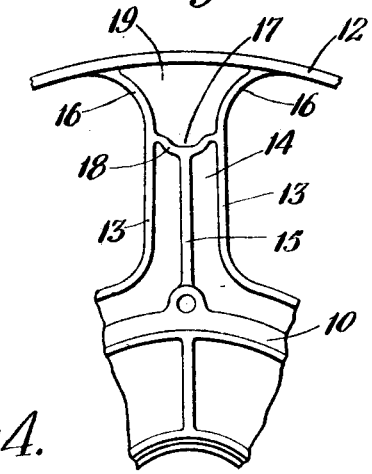
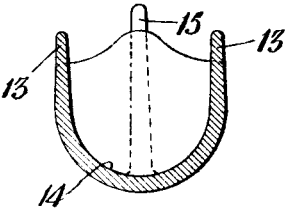
Inventor
John W. Holt
By his Attorney
Clarence B Kerr Sept. 25, 1928.  
J. W. HOLT  
1,685,130  
VEHICLE WHEEL STRUCTURE  
Filed Oct. 5, 1926   2 Sheets-Sheet 2
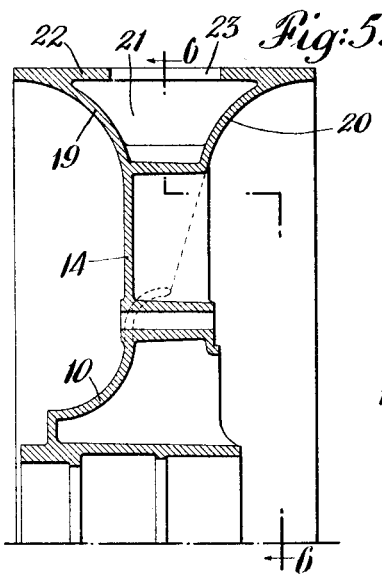
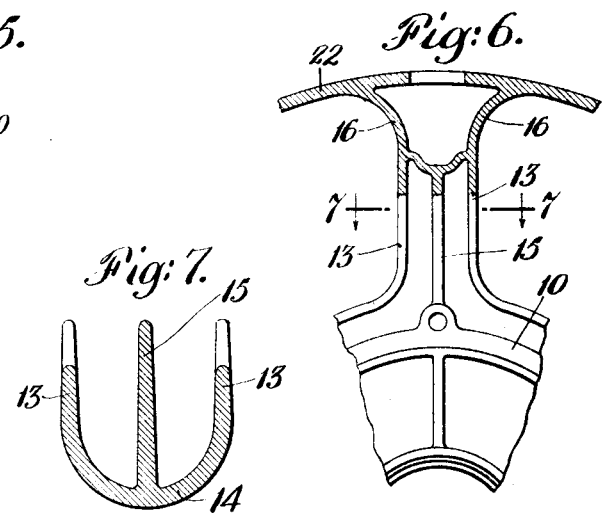
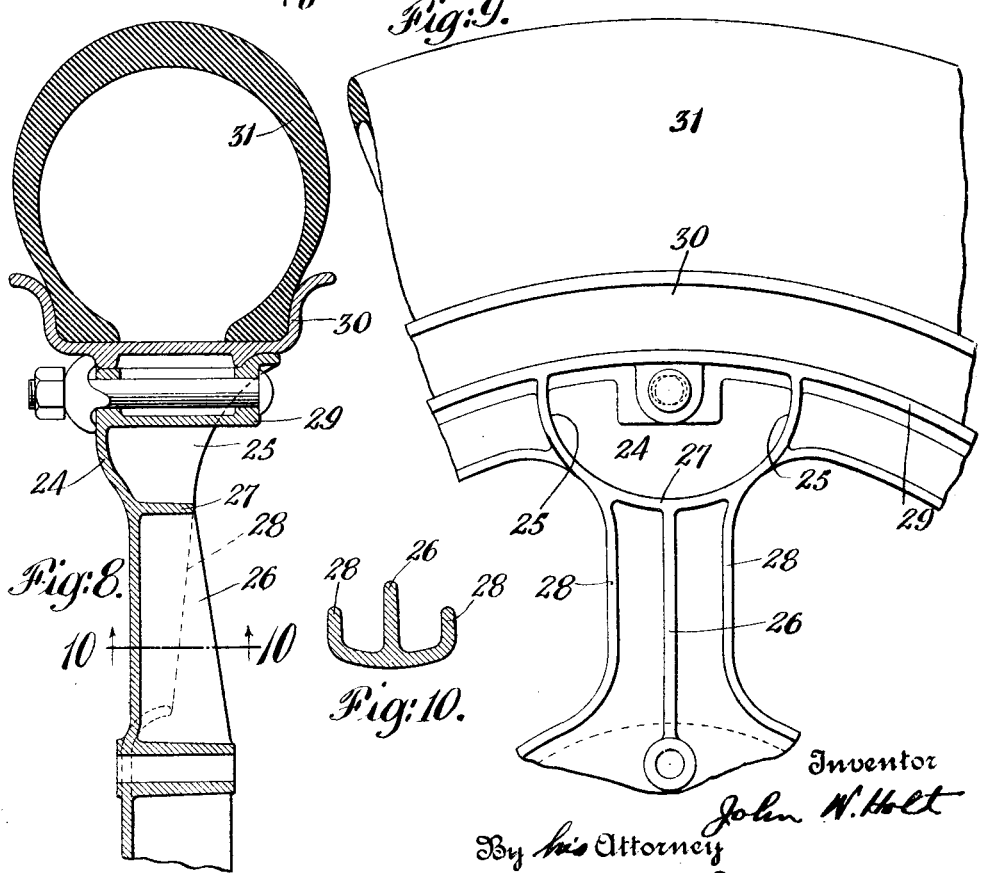
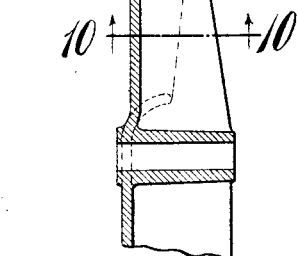
Inventor  
John W. Holt  
By his Attorney  
Clarence A. Kerr Patented Sept. 25, 1928.

1,685,130

UNITED STATES PATENT OFFICE.

JOHN W. HOLT, OF CLEVELAND, OHIO, ASSIGNOR TO NATIONAL MALLEABLE AND STEEL CASTINGS COMPANY, OF CLEVELAND, OHIO, A CORPORATION OF OHIO.

VEHICLE WHEEL STRUCTURE.

Application filed October 5, 1926. Serial No. 139,626.

Fig. 1 is a view in front elevation of a portion of a vehicle wheel embodying the invention; Fig. 2 is a view in transverse vertical section of the parts shown in Fig. 1; Fig. 3 is a view in rear elevation of a detail of the construction shown in Fig. 1; Fig. 4 is a view in horizontal section and on an enlarged scale taken on the line 4—4 of Fig. 1; Fig. 5 is a view similar to Fig. 2 showing a modified form of the invention; Fig. 6 is a view partly in rear elevation and partly in vertical section taken on the line 6—6 of Fig. 5; Fig. 7 is a view in horizontal section taken on the line 7—7 of Fig. 6; Fig. 8 is a view similar to Fig. 5 showing still another structure embodying the invention; Fig. 9 is a view in rear elevation of the parts shown in Fig. 8; and Fig. 10 is a view in horizontal section taken on the line 10—10 of Fig. 8.

My invention relates generally to the construction of automotive vehicle wheels of the cast metal type. In the formation, by casting, of wheels having radially extending spokes connected at their outer ends by a felloe, considerable difficulty is had in guarding against objectionable shrinkage effects. Following the casting operation as the casting cools the felloe portion tends to contract to a greater extent than is permitted by the remaining portions of the wheel structure. The contraction of the felloe in particular is resisted by the spokes which exert a radially directed pressure opposing such contraction. This condition tends to set up shrinkage strains in the structure which weaken the casting and in many cases result in the formation of tiny cracks and even in destructive fractures. On the other hand, in a wheel structure having a massive hub section and a relatively light felloe, the felloe portion being of lighter construction cools first with the result that when the hub and spoke members undergo cooling they tend to pull away from the felloe. It will be seen that this condition, which represents the other extreme, can be equally objectionable with the condition first referred to. My invention has for its object the provision of a cast wheel construction which will be free from the objectionable features heretofore characteristic of wheels of this general type. With this object in view a construction is provided in which the spoke members have a flared or spread construction at their outer ends, the spokes being provided with central ribs having forked or bifurcated outer end portions which merge into the outer walls of the spokes and thence into the felloe portion. By thus distributing or enlarging the area of engagement of the spoke members with the felloe as well as by nullifying in part the direct radial thrust of the spoke members, a resilient or yielding characteristic is introduced into the spoke structure which prevents the setting up of shrinkage strains in the casting as a whole. Other features of the invention will be hereinafter referred to.

Referring to the drawings for a more detailed description of the invention, in Figs. 1 to 4 inclusive a vehicle wheel structure of the cast metal type is shown which includes a hub member 10 and radially disposed spoke members 11 connected at their outer ends by a felloe member 12. The felloe 12 is adapted to receive a tire supporting rim in a well known manner.

The spoke structure of the wheel preferably has a channeled formation in cross section so that two lateral flange members 13 connected by an intermediate web member 14 are employed to make up the spoke structure. In addition, an intermediate web or flange member 15 forms part of the spoke structure so that a rigidly constructed spoke member is thus provided.

The centrally disposed web or flange member 15 is formed of a relatively massive cross section so that a considerable degree of rigidity or stiffness is provided in this part of the spoke structure.

It will be clear that were the radially disposed flange members 13 and 15 to be continued from their point of engagement with the hub structure 10 to the felloe member 12, distorting strains would be set up in the hub structure upon the cooling of the casting when taken from its mold.

In order to prevent the setting up of distorting strains in the casting which forms the wheel structure, the lateral flange members 13 are spread apart or formed with a flaring disposition at their outer ends adjacent to their points of connection with the felloe member 12. This flaring disposition of the flange members 13 is shown at 16 wherein the flanges are curved about centers external to the spoke structure and on opposite sides thereof. The flaring disposition thus effected does away with the rigid strut-like structure which would characterize the spoke structure were it to be continued in a radially disposed straight line from its point of connection with the hub member 10 to its point of connection with the felloe member 12. The flaring or spreading portions 16 of the outer ends of the lateral flanges 13 of the spoke structure are adapted to bend or yield sufficiently to compensate for strains or stresses set up in the wheel structure in the cooling of the casting when it is taken from the mold.

In order to further enhance the yielding effect of the spoke structure adjacent its point of connection with the felloe 12, the rigid central rib or web member 15 terminates at 17 at a point short of the point of connection of the spoke member with the felloe 12 and a transverse rib or head member 18 is located at the outer end of the rib member 15 and at the beginning of the flaring portions 16. The terminal member 18 in one sense represents a bifurcation of the rib member, the members of which are joined to the lateral flange members 13 at their outer ends. The flared end portions 16 of the joined head member 18 and flanges 13 together with the outward extension 19 of the central web member 14 provide a flaring head or extremity for the spoke structure which possesses a much less degree of rigidity than would be possessed by the spoke structure were the central rib member 15 to be extended to a point of connection with the felloe portion 12 of the wheel.

It will be seen that I have provided a spoke structure which is provided throughout the greater portion of its length with a reinforcing rib member 15 and that, at the same time, a necessary yielding factor is introduced into the structure through the flaring connection provided at 16 and 19 between the rigid body portion of the spoke structure and the felloe 12.

In the form of the invention shown in Figs. 5, 6 and 7, the flared end portion of the spoke structure is provided with a flaring wall member 20 at the inner side of the wheel so that the head or terminal portion of the spoke includes a chamber 21 closed on all its lateral sides. In this form of the invention, the felloe member 22 is provided with an opening 23 in register with the chamber 21 to facilitate the casting operation.

In the form of the invention shown in Figs. 8, 9 and 10, an expanded formation of the head or outer end of the spoke structure is shown in which the outer wall 24 and the lateral walls 25 have a curved formation which is in reverse to the curvature of the flaring sections shown in the other forms of the invention. In this case the center of curvature of the walls falls within the limits of the spoke instead of outside the limits thereof. In other words, the outer surfaces of the expanded walls are convex instead of concave. The central rib member 26 of the spoke structure terminates in a head 27 which is joined to the lateral wall members 25 of the wall section, which are prolongations of the side flange members 28 of the spoke. In this form of the invention, as in the remaining figures, the rigid structure of the spoke is again used together with the yielding formation provided by a distribution of the points of engagement of the spoke with the felloe member.

In this form of the invention the felloe member 29 is shown with a tire supporting rim 30 mounted thereon on which a pneumatic tire 31 is carried in a known manner.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:—

1. In a vehicle wheel of the cast metal type, radial spoke members having the formation of a U-shaped channel in cross section, the lateral flanges and the intermediate web of the channel shaped spoke structure being flared outwardly at their points of connection with the felloe portion of the wheel, and a web member transverse to the length of the spoke connecting the lateral flanges at the point of beginning of the flaring portion.

2. In a vehicle wheel of the cast metal type, radial spoke members having the formation of a U-shaped channel in cross section, a radially extending centrally disposed rib member between the lateral flanges of said U-shaped spoke member, the lateral flanges of the spoke member having an outwardly flared conformation adjacent their points of connection with the felloe portion, and a transverse web member connecting the lateral flanges at the points of beginning of the flaring portions, the outer end of said centrally disposed radially extending rib member terminating at said transverse web member.

3. In a vehicle wheel of the cast metal type, a radial spoke member having a longitudinally extending centrally disposed rib, said rib being bifurcated at its outer end to provide distributed areas of engagement with the felloe portion of the wheel.

4. In a vehicle wheel of the cast metal type, a radial spoke member having a longitudinally extending centrally disposed rib member, and flanges extending along the lateral edges of the spoke member, said rib member being bifurcated at its outer end, the bifurcations of the rib member and said lateral flange members being joined and formed into a flaring connection between the spoke and the felloe portion of the wheel.

5. In a vehicle wheel of the cast metal type, a radial spoke member having a U-shaped cross section opening to the inner side of the wheel, and a centrally disposed rib member extending along the spoke between the flanges of the U-shaped spoke structure, said rib member being bifurcated at its outer end and the bifurcations being joined to the flanges, said flanges and the outer web of the spoke structure having a flared formation at the point of juncture with the felloe portion of the wheel.

6. In a vehicle wheel of the cast metal type, a radial spoke member having a U-shaped cross section opening to the inner side of the wheel, a centrally disposed rib member extending along the spoke between the flanges of the U-shaped structure, said rib member being bifurcated at its outer end and the bifurcations being joined to the flanges, said flanges and the outer web of the spoke structure having a flared formation at the point of juncture with the felloe portion of the wheel, and a web member forming a flared closing wall for the inner side of the flared end section of the spoke member.

JOHN W. HOLT.